US010271119B2

(12) United States Patent
Fujita et al.

(10) Patent No.: US 10,271,119 B2
(45) Date of Patent: Apr. 23, 2019

(54) HEADREST HAVING SPEAKER

(71) Applicant: Delta Tooling Co., Ltd., Hiroshima-shi (JP)

(72) Inventors: Etsunori Fujita, Higashihiroshima (JP); Yumi Ogura, Higashihiroshima (JP); Takao Uchiyama, Aki-gun (JP); Kazuhiro Takenaka, Hiroshima (JP); Kazunari Yasui, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 0 days.

(21) Appl. No.: 15/550,684

(22) PCT Filed: Feb. 12, 2016

(86) PCT No.: PCT/JP2016/054089
§ 371 (c)(1),
(2) Date: Aug. 11, 2017

(87) PCT Pub. No.: WO2016/129663
PCT Pub. Date: Aug. 18, 2016

(65) Prior Publication Data
US 2018/0035185 A1 Feb. 1, 2018

(30) Foreign Application Priority Data

Feb. 14, 2015 (JP) .................................. 2015-027040

(51) Int. Cl.
*H04R 5/02* (2006.01)
*H04R 1/02* (2006.01)
(Continued)

(52) U.S. Cl.
CPC .............. *H04R 1/023* (2013.01); *A47C 7/38* (2013.01); *A47C 7/72* (2013.01); *B60N 2/80* (2018.02);
(Continued)

(58) Field of Classification Search
CPC ...... H04R 2499/13; H04R 1/02; H04R 1/028; H04R 1/025; H04R 3/00; H04R 3/12;
(Continued)

(56) References Cited

U.S. PATENT DOCUMENTS 3,792,754 A * 2/1974 Hanson ................ H04R 5/0335
181/130
4,038,499 A 7/1977 Yeaple
(Continued)

FOREIGN PATENT DOCUMENTS

JP 4-325338 A 11/1992
JP 7-7780 A 1/1995
(Continued)

OTHER PUBLICATIONS

International Search Report dated May 10, 2016 in PCT/JP2016/054089.
(Continued)

*Primary Examiner* — Leshui Zhang
(74) *Attorney, Agent, or Firm* — Oblon, McClelland, Maier & Neustadt, L.L.P.

(57) ABSTRACT

The present invention prevents a three-dimensional fabric arranged in front surfaces of speakers from flapping due to sound. In the respective front surface sides of, sound-emitting direction regulating members that include annular portions that project forward by a predetermined distance are arranged. A three-dimensional fabric is tensioned and arranged so as to cover the front surface sides of the sound-emitting direction regulating members. When the three-dimensional fabric is pressed against the annular portions configuring the sound-emitting direction regulating members, the annular portions bite into the three-dimensional fabric since the three-dimensional fabric has a predetermined thickness. The annular portions are provided so
(Continued)

as to surround diaphragms of the speakers. Sound output from the speakers passes inside the annular portions. However, the periphery of a region of the three-dimensional fabric in which sound passes is supported by the biting of the annular portions, thereby preventing the three-dimensional fabric from flapping widely in response to the sound.

10 Claims, 13 Drawing Sheets

(51) Int. Cl.
| | | |
|---|---|---|
| *B60N 2/80* | (2018.01) | |
| *A47C 7/38* | (2006.01) | |
| *A47C 7/72* | (2006.01) | |
| *B60R 11/02* | (2006.01) | |
| *H04R 1/32* | (2006.01) | |
| *B60N 2/879* | (2018.01) | |

(52) U.S. Cl.
CPC .............. *B60N 2/879* (2018.02); *B60R 11/02* (2013.01); *H04R 1/02* (2013.01); *H04R 1/028* (2013.01); *H04R 1/32* (2013.01); *H04R 2499/13* (2013.01)

(58) Field of Classification Search
CPC ...... H04R 5/02; H04R 5/023; H04R 2420/07; H04R 2420/01; H04R 2430/01; G10K 15/02; G10K 15/04; G10K 11/22; G10K 11/0217; H04S 7/303; H04S 7/30; H04S 7/302; H04S 2400/11; H04S 2420/01; H04S 5/00; H04S 5/02; H04S 7/307; H04S 2400/01; H04S 3/00; H04S 3/002; H04S 2400/05; H04S 2400/07; H04S 1/00; H04S 1/007; G10L 19/008; G10L 21/0364; B60R 11/02; B60R 11/0247; B60R 2011/0017
USPC ........ 381/1, 2, 7, 10, 11, 17, 18, 19, 22, 23, 381/310, 311, 27, 28, 61, 77, 78, 80, 81, 381/85, 86, 89, 332, 300–308; 340/692, 340/327, 384.73, 392.1, 392.4, 404.1
See application file for complete search history.

(56) References Cited

U.S. PATENT DOCUMENTS

| | | | |
|---|---|---|---|
| 2007/0257528 A1* | 11/2007 | Akaike | ................ B60N 2/002 297/216.12 |
| 2014/0270322 A1 | 9/2014 | Silverstein | |
| 2014/0355783 A1 | 12/2014 | Subat | |
| 2015/0201260 A1* | 7/2015 | Oswald | ................ H04R 1/025 381/86 |

FOREIGN PATENT DOCUMENTS

| | | |
|---|---|---|
| JP | 7-42077 A | 2/1995 |
| JP | 9-307979 A | 11/1997 |
| JP | 2001-161487 A | 6/2001 |
| JP | 2008-154921 A | 7/2008 |
| JP | 2009-247388 A | 10/2009 |

OTHER PUBLICATIONS

Extended European Search Report dated Feb. 2, 2018 in Patent Application No. 16749306.3, 8 pages.

* cited by examiner

TEST SPEED: 50mm/min
COMPRESSION PLATE: Φ30mm

HEADREST HAVING SPEAKER

TECHNICAL FIELD

The present invention relates to a headrest having a speaker.

BACKGROUND ART

Patent Document 1 discloses a headrest as follows. That is, the headrest includes: a substantially rectangular member that forms a frame of the headrest; a pad member that is arranged in a front surface side of the substantially rectangular member; first net members that are arranged in right and left of a front surface side of the pad member; a slab member that is arranged between the right and left first net members; and a skin member that covers the right and left first net members and the slab member.

The substantially rectangular member that forms the frame of the headrest includes a panel member arranged in a front surface side, and a box-shaped cover member in which the panel member is mounted to a front surface opening. In an interior space covered by the panel member and the cover member, right and left pair of speakers is installed. In the panel member, the pad member, and the skin member, in each of portions that locate in a front surface of a sound output unit of each of the speakers, through holes for passing sound are formed. Accordingly, sound of the speakers is output to the outside through the through holes and the first net members.

PRIOR ART DOCUMENT

Patent Document

Patent Document 1: Japanese Patent Application Publication No. 2009-247388

SUMMARY OF THE INVENTION

Problem to be Solved by the Invention

The headrest in Patent Document 1 has simple structure in which the speakers are arranged in the headrest, and the through holes are provided in corresponding portions for passing speech from the speakers, or the like. More particularly, the speakers that are output devices of sound are protected by being enclosed by the panel member and the cover member, so as not to be damaged due to a load in normal using applied to the headrest, while the through holes are provided for outputting the sound to the outside, the first net members for preventing a part of a head part from falling in the formed through holes are further provided, and in addition, the slab member is provided not to generate steps between the right and left first net members in order to secure more comfortable supporting feeling.

The first net members in Patent Document 1 simply have a function of preventing the head part from falling into the through holes, and are simply arranged by being sandwiched between the skin member and the pad member. Further, the first net members simply prevent the head part from falling into the through holes. Thus, it is essential that a mesh of the first net members is formed to be a size to pass the sound that has been output from the speakers and passed through the through holes, as it is (see paragraph "0019" of Patent Document 1). Accordingly, the output sound from the speakers is propagated to air as it is. That is, presence or absence of the first net members does not affect the way of propagating of the output sound at all. In addition, even when a plurality of speakers are used, a stereo effect is hard to be felt when the speakers are too close. Thus, the speakers are required to be set with appropriate distance, for increasing the stereo feeling. However, in a range of limited size of the headrest, separable distance is limited and the stereo feeling is hard to exhibited.

The first net members are only sandwiched between the skin member and the pad member, and there is no presser in a surface that faces with the through holes. Thus, when the sound output from the speaker is, for example, around the resonance frequency of the first net members, the first net members flap and can affect acoustic characteristics.

The present invention has been made in consideration of the above, and has a problem of providing the headrest having a speaker that can increase the stereo feeling of sound output from the speakers in the limited arrangement space of the headrest, prevent flapping due to the sound of a three-dimensional fabric arranged in front surfaces of the speakers, and prevent the acoustic characteristics from being degraded.

Means for Solving the Problem

In order to solve the problem, the headrest having a speaker of the present invention is characterized by having a plurality of speakers that are supported in a headrest frame with predetermined intervals, sound-emitting direction regulating members that surround a periphery of a diaphragm of each speaker, and include annular portions that project forward by a predetermined distance, and a three-dimensional fabric that is tensioned and arranged in a state where each of the annular portions of each of the sound-emitting direction regulating members bites into the three-dimensional fabric.

It is preferable that a sound propagation preventing part that prevents the sound from propagating between the speakers, is provided between the annular portions of the adjacent sound-emitting direction regulating members.

In this case, it is preferable that in between annular portions of the adjacent sound emitting direction regulating members is filled with foam, and the foam is the sound propagation preventing part.

In addition, the present invention also can be configured so that the three-dimensional fabric has a size that extends from one of the sound emitting direction regulating members to the other of the sound emitting direction regulating members, and an intermediate region that locates between the adjacent annular portions in the three-dimensional fabric is the sound propagation preventing part. In this case, it is preferable that the intermediate region of the three-dimensional fabric that composes the sound propagation preventing part is filled with foam.

It is preferable that the three-dimensional fabric is a three-dimensional knitted fabric.

It is preferable that a front surface of the three-dimensional fabric includes a head part supporting plate that is elastically supported. In addition, it is preferable that an easy-to-deform part that is a starting point of deformation when the head part supporting plate receives a load is set in the head part supporting plate. It is preferable that the easy-to-deform part is formed of a groove formed longitudinally near a substantially center in a width direction of the head part supporting plate.

Effect of the Invention

According to the present invention, the front surfaces of each of the speakers are installed with the sound-emitting direction regulating members formed of the annular portions that project forward by a predetermined distance, and the three-dimensional fabric is tensioned and arranged so as to cover the front surface side of the sound-emitting direction regulating members. Since the three-dimensional fabric has a predetermined thickness, when the three-dimensional fabric is pressed against the annular portions that compose the sound-emitting direction regulating members, the annular portions bite into the three-dimensional fabric. The annular portions are provided so as to surround the diaphragms of the speakers. Sound output from the speakers passes insides of the annular portions. However, since a periphery of a region of the three-dimensional fabric where the sound passes is supported by the bite of the annular portions, the flapping widely in response to sound around the resonance frequency is prevented, and the acoustic characteristics can be prevented from being degraded. In addition, for the output sound of the speakers, since the three-dimensional fabric that locates in the front surfaces of the speakers is provided with a predetermined tensile force, fine vibration is generated in a yarn that consists the three-dimensional fabric and sound having higher sound pressure level can be emitted.

The annular portions surround the diaphragms of the speakers and project forward by a predetermined distance, and thereby, a sound emitting direction is regulated and interference with sound output by adjacent other speakers can be prevented.

Further, it is preferable that a part between the annular portions of adjacent sound-emitting direction regulating members is the sound propagation preventing part by filling the part with foam or the like. Thereby, the sound propagating between adjacent speakers is prevented and the acoustic characteristics can be improved. By using the annular portions and the sound propagation preventing part together, although it is the headrest in which distance between right and left speakers is limited, interference between output sound of the speakers is prevented and the stereo feeling can be further increased.

DESCRIPTION OF THE EMBODIMENTS

Figure 1:
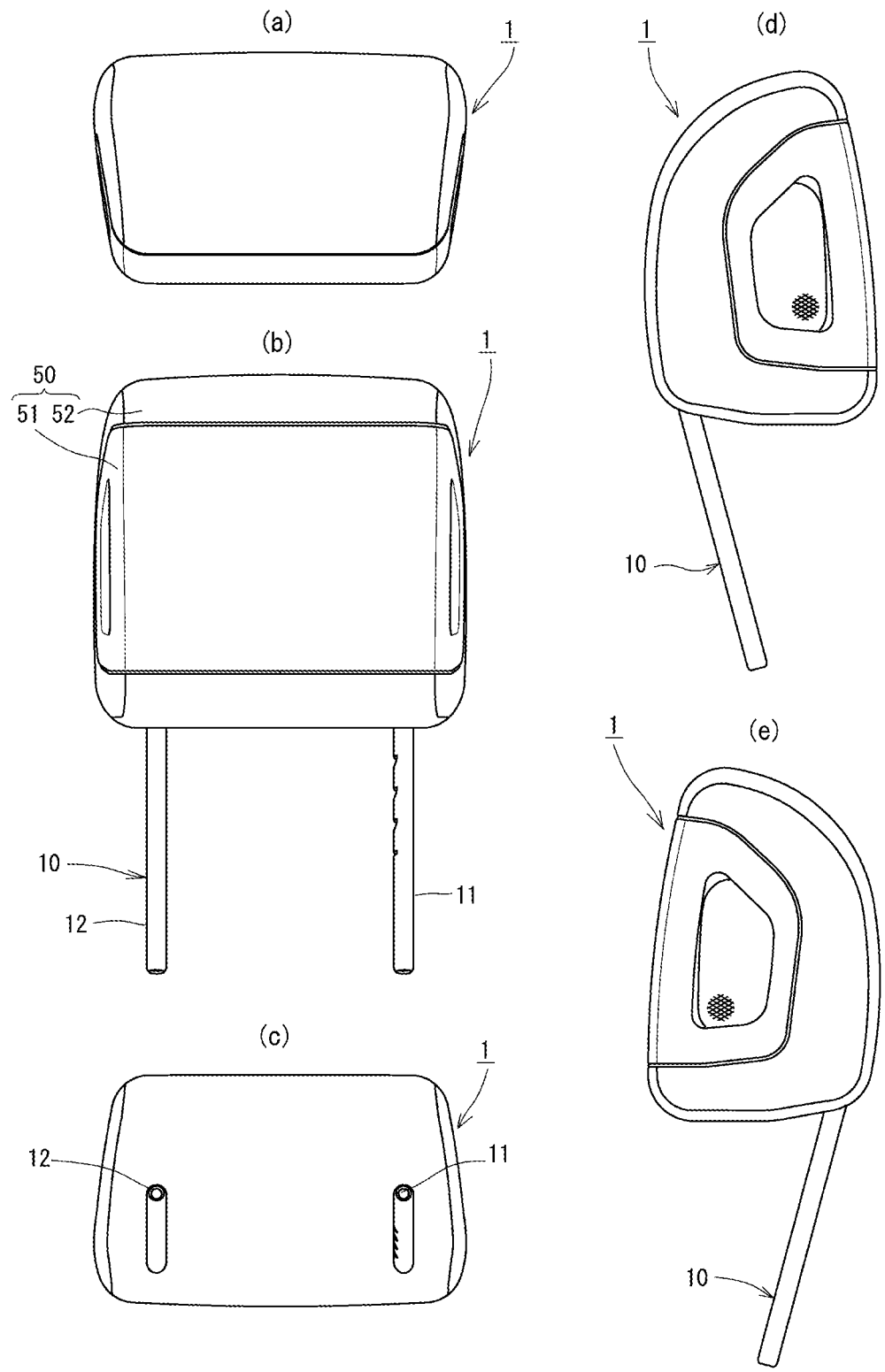
FIG. 1 is a diagram showing appearance of a headrest having a speaker according to an embodiment of the present invention. (a) is a plan view, (b) is a front view, (c) is a bottom view, (d) is a left-side view, and (e) is a right-side view.

Following further describes the present invention in detail on the basis of the embodiments shown in the drawings. FIG. 1 to FIG. 5 are diagrams showing a first embodiment of the present invention. A headrest having a speaker (hereinafter, simply referred to as "headrest") 1 of the present embodiment is configured to have a headrest frame 10, speakers 20, 30, a cushioning layer 40, a skin member 50, and the like.

In the present embodiment, the headrest frame 10 is formed in a substantially U-shape, extends in a substantially perpendicular direction, and is configured to have a right and left pair of longitudinal frame parts 11, 12 that are connected to each other in upper parts. The longitudinal frame parts 11, 12 are inserted to a pair of guide parts (not shown) respectively that are supported by a back frame of a seat back part with predetermined intervals in right and left. The position of the longitudinal frame parts 11, 12 can be adjusted to be an appropriate height.

In the present embodiment, the speakers 20, 30 are arranged in a pair of two with predetermined intervals in right and left of the headrest 1. The speakers 20, 30 are configured to have enclosures 21, 31, and speaker units 22, 32, respectively.

Figure 4:
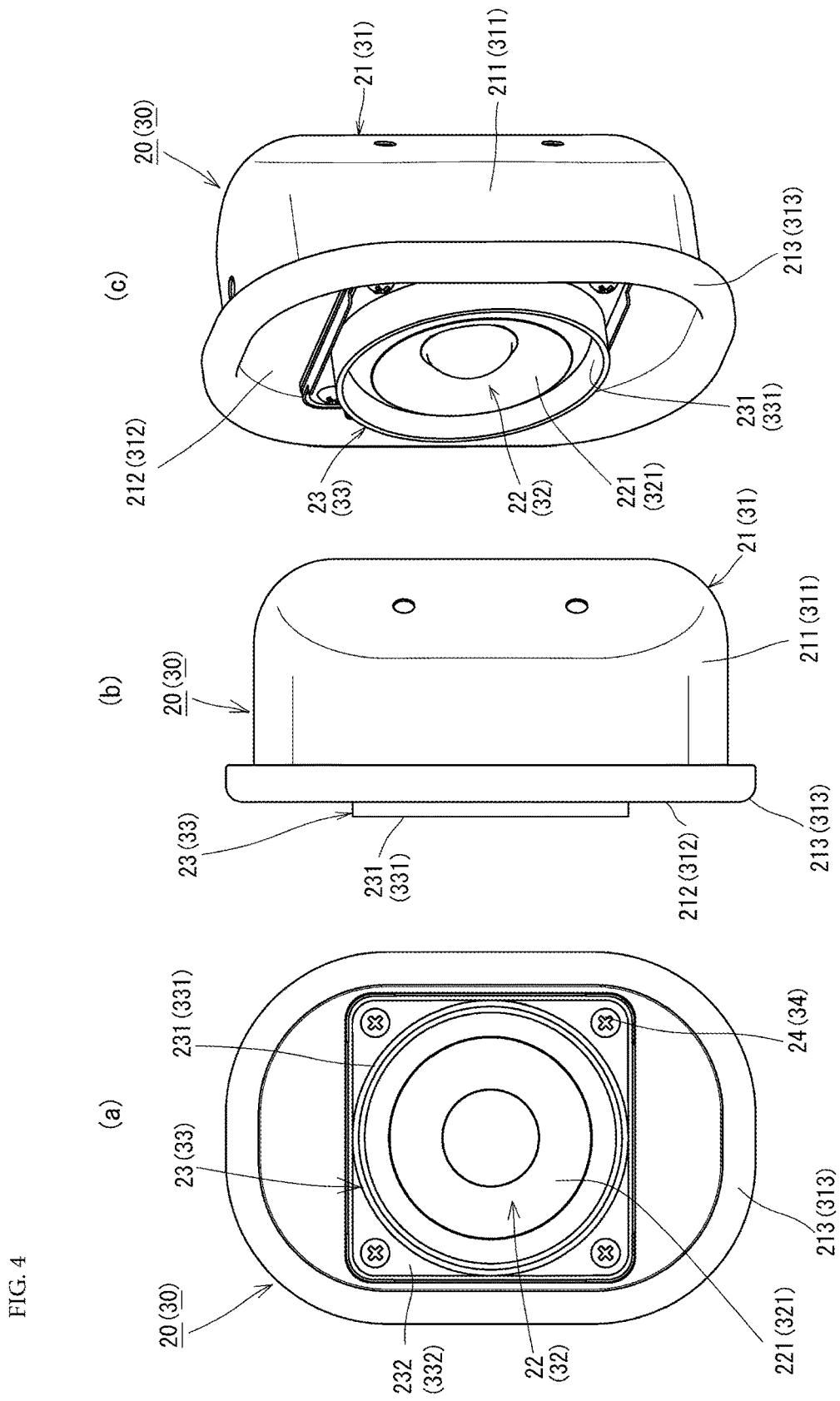
FIG. 4 is a diagram showing the speaker. (a) is a front view, (b) is a side view, and (c) is a perspective view.
Figure 5:
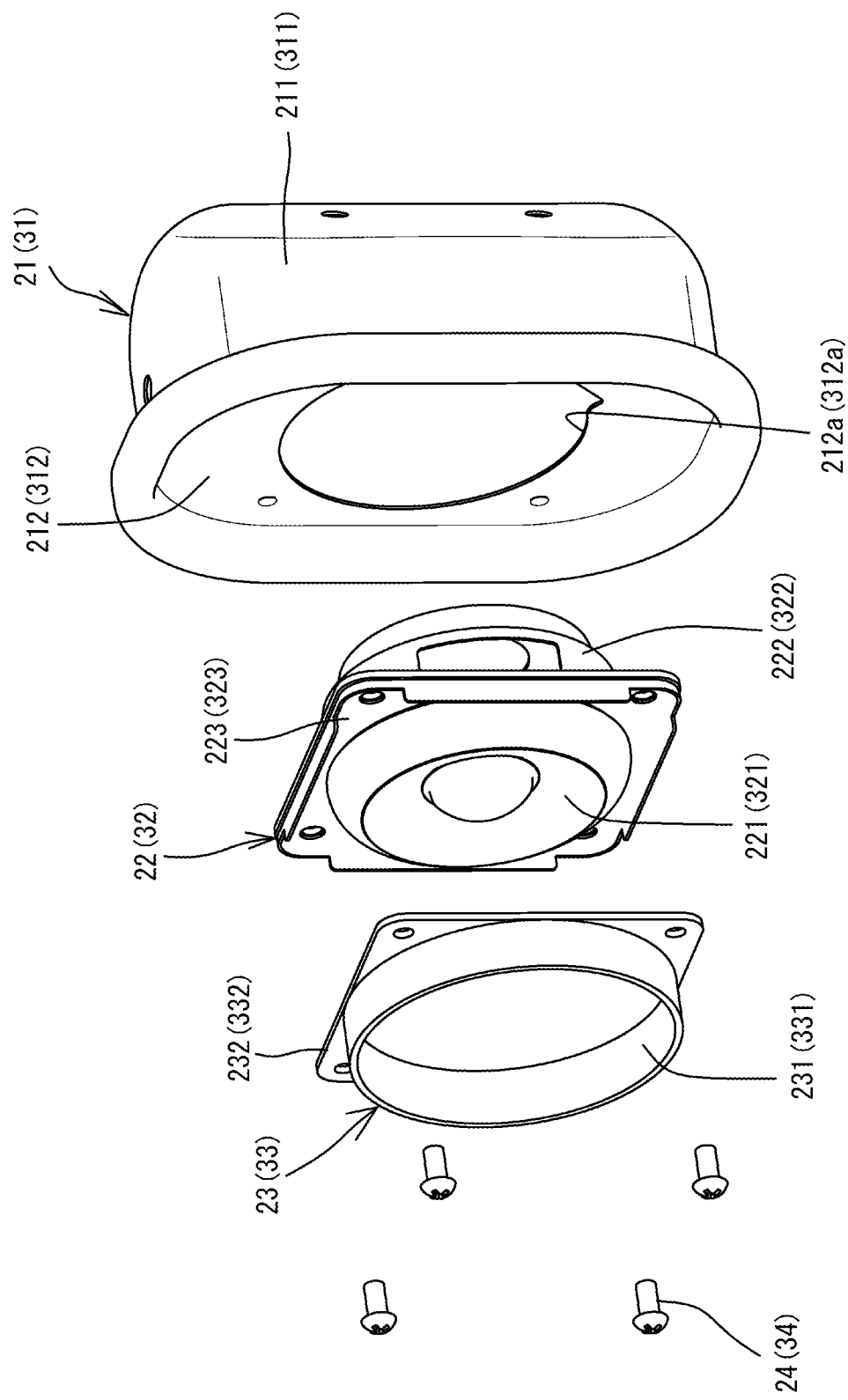
FIG. 5 is an exploded perspective view of the speaker.
Figure 6:
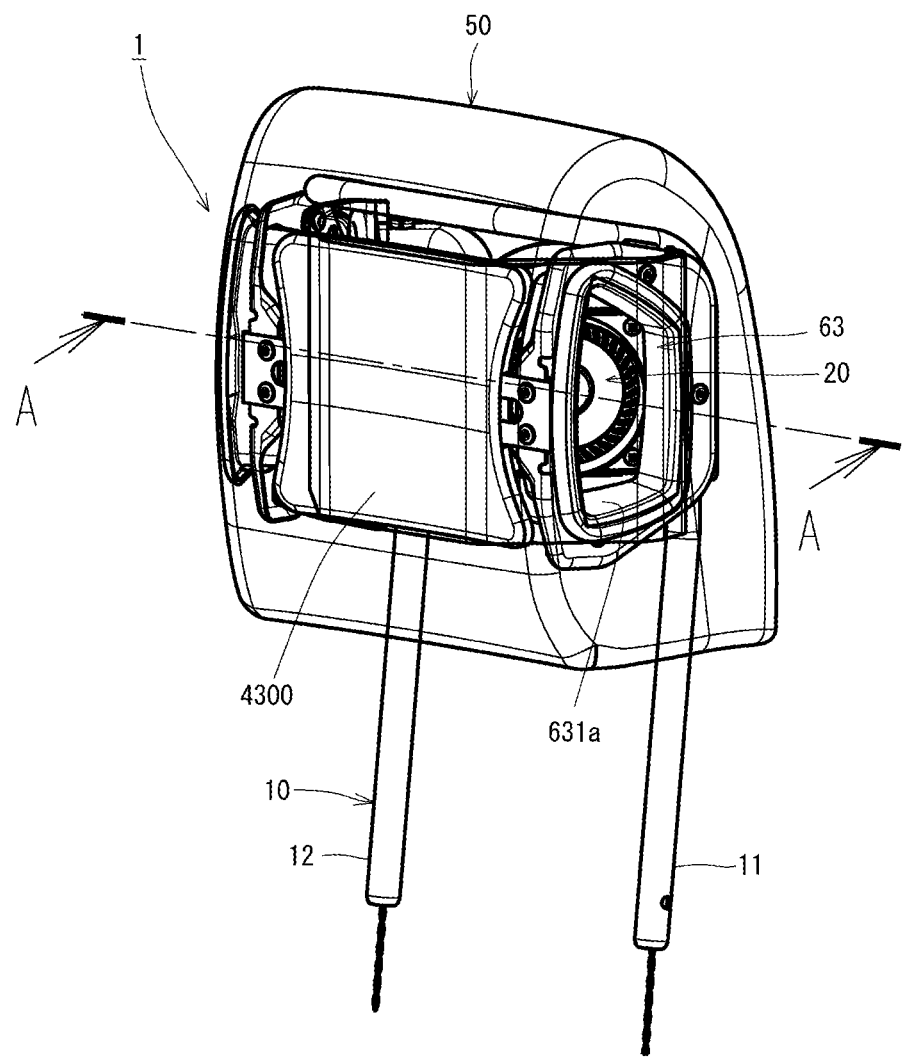
FIG. 6 is a perspective view showing perspectively an inner mechanism of the headrest having the speaker according to another embodiment of the present invention.
Figure 7:
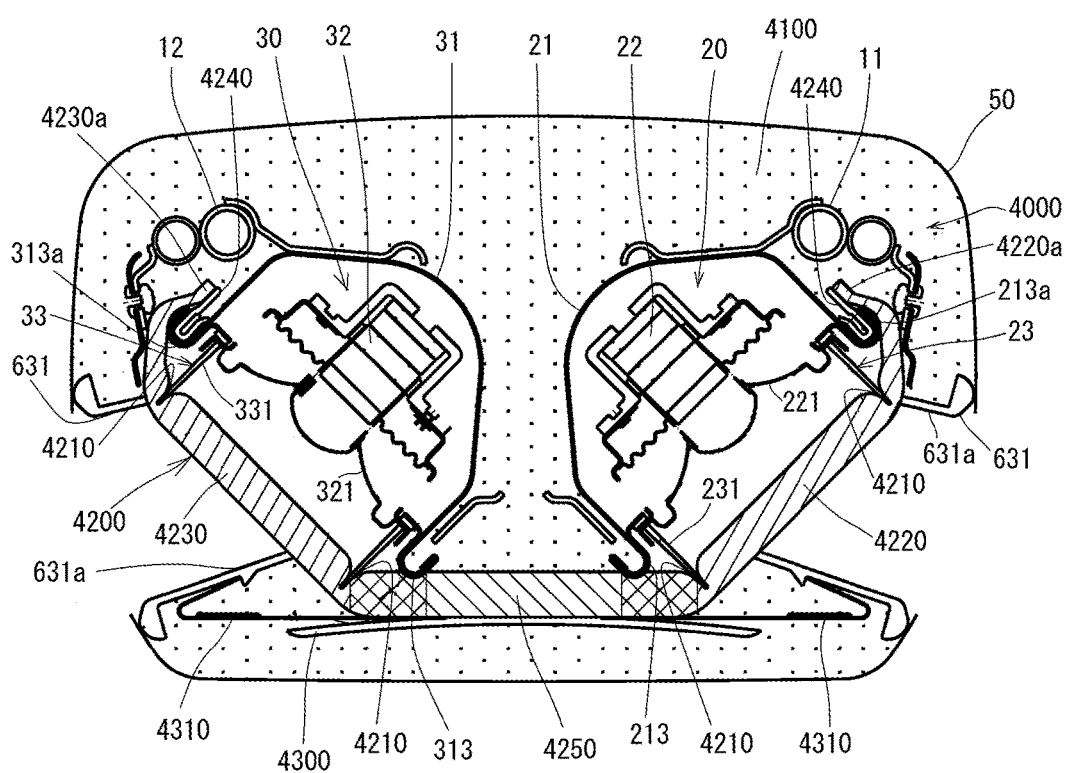
FIG. 7 is a cross-sectional view taken along line A-A of FIG. 6.
Figure 8:
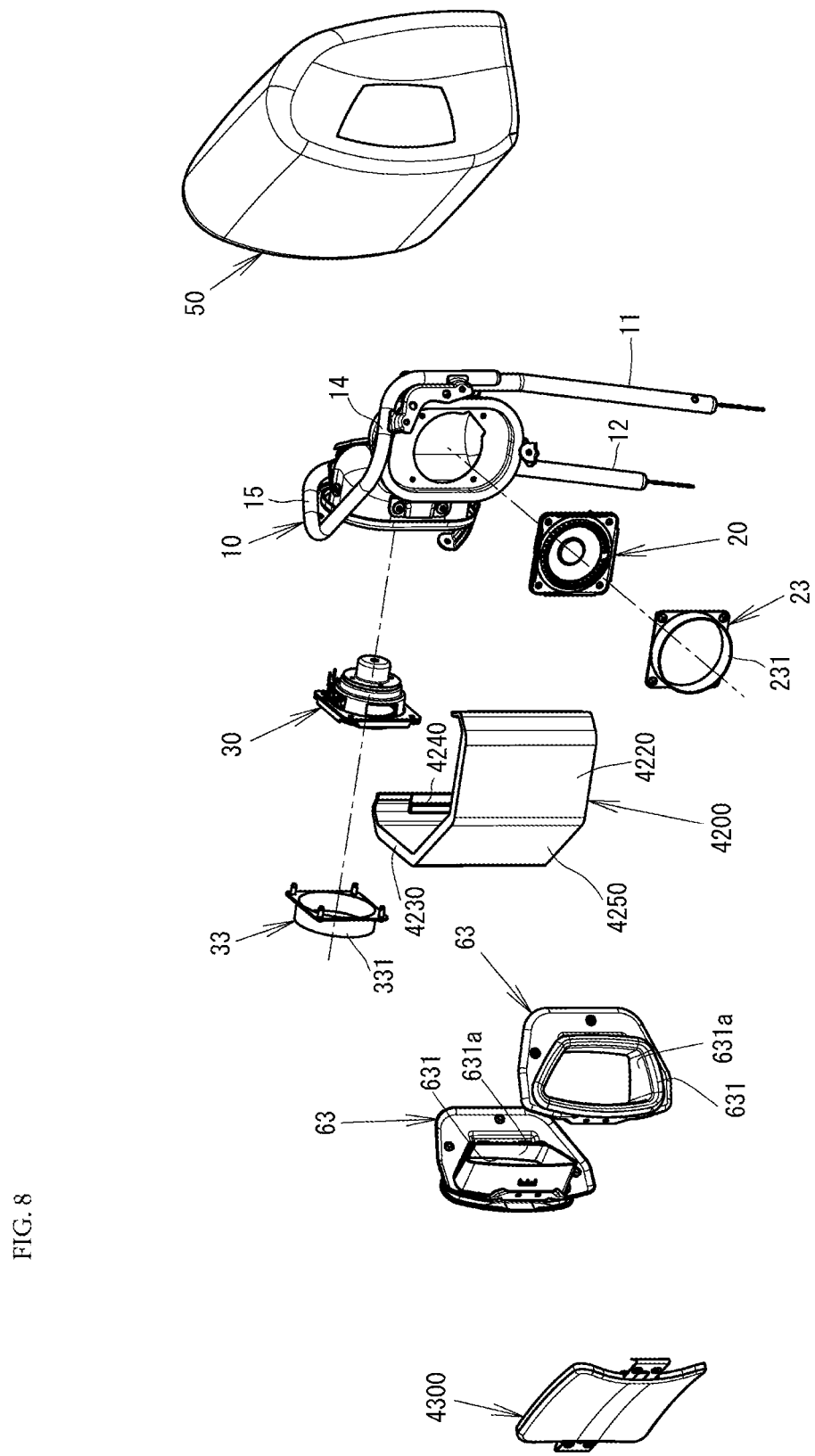
FIG. 8 is an exploded perspective view of the headrest having the speaker of FIG. 6.

As shown in FIG. 4 and FIG. 5, the enclosures 21, 31 particularly include body cases 211, 311 that are formed to be substantially elliptical shapes viewed from a front surface, and covering plates 212, 312 that are substantially elliptical shapes and are mounted to a front surface opening part of the body cases 211, 311. It is preferable that both of the body cases 211, 311 and the covering plates 212, 312 are made of metal, peripheral edge parts 213, 313 are overlapped and bent in a substantially U-shape, and end edges are integrated to each other by caulking (including hemming). In a substantially center part of the covering plates 212, 312, window parts 212a, 312a are opened.

Figure 2:
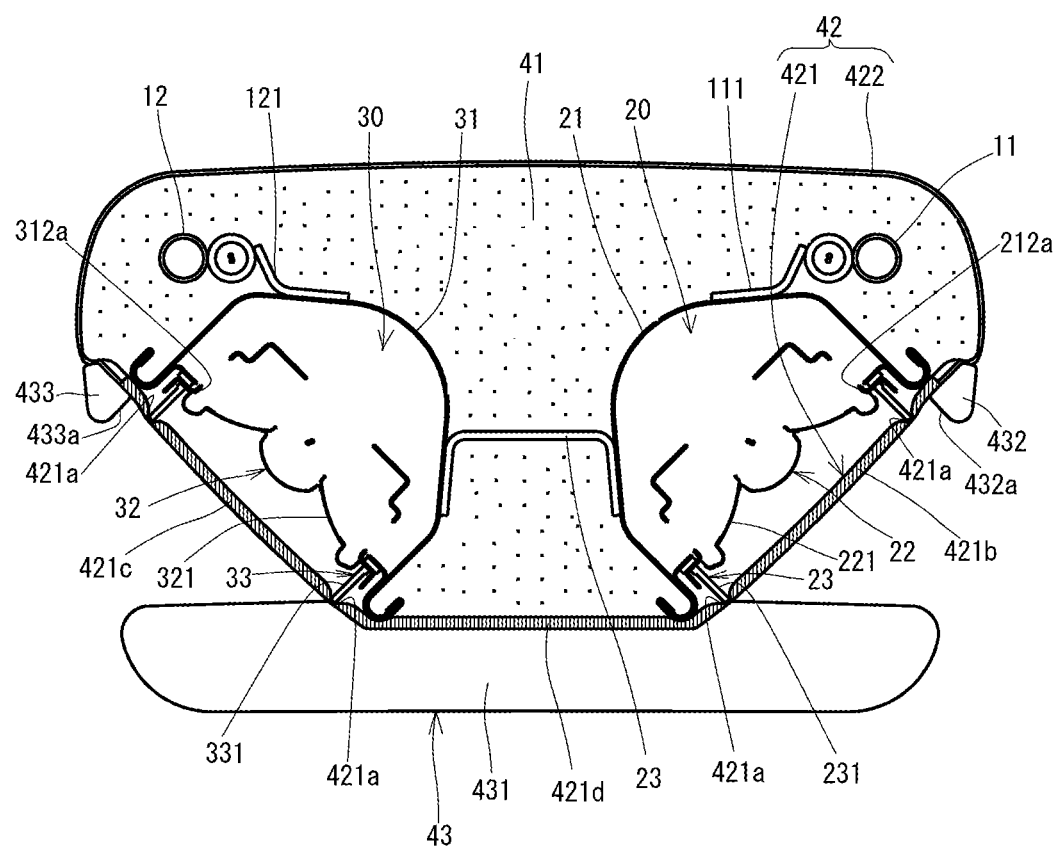
FIG. 2 is a cross-sectional view for explaining internal structure of the headrest having the speaker of FIG. 1.

The body cases 211, 311 of the enclosures 21, 31 are attached to upper parts of the right and left longitudinal frame parts 11, 12, respectively, via attachment plates 111, 121 (see FIG. 2). At this time, the enclosures 21, 31 are attached in a right and left symmetrical posture so as to face outward, not forward, with respect to a center of the headrest 1. In the present embodiment, the window parts 212a, 312a of the covering plates 212, 312 locate each in a posture of facing outward by about 45 degrees with respect to forward (right in front). For example, when the present invention is used as the headrest 1 of a seat of a vehicle, a posture of facing outward by 20 degrees to 70 degrees with respect to forward is preferable, and a posture of facing outward by about 45 degrees with respect to forward as the present embodiment is more preferable.

The pair of enclosures 21, 22 are connected and fixed to each other via a connection plate 23 made of a steel plate. The connection plate 23 can be fixed by welding with respect to the enclosures 21, 22. However, fixation by using a fastening member such as a rivet is preferred to prevent deformation due to heat in welding.

The speaker units 22, 32 have diaphragms 221, 321, and rear projection frame parts 222, 322 that support the diaphragms 221, 321, in a front part. The speaker units 22, 32 are installed by fixing flange parts 223, 323 that project outward of the diaphragms 221, 321 to the covering plates 212, 312 so that the rear projection frame parts 222, 322 are accommodated in the body cases 211, 311 from the window parts 212a, 312a formed in the covering plates 212, 312 of the enclosures 21, 31, and the diaphragms 221, 321 face to the outside from the window parts 212a, 312a.

In the present embodiment, the speaker units 22, 32 are attached with sound-emitting direction regulating members 23, 33. The sound-emitting direction regulating members 23, 33 have inner diameters that are slightly larger than outer diameters of the diaphragms 221, 321, and can surround the diaphragms 221, 321. The sound-emitting direction regulating members 23, 33 have annular portions 231, 331 that have height to project forward by a predetermined distance, and attachment plate parts 232, 332 that project outward from base end parts of the annular portions 231, 331, and have a size corresponding to the flange parts 223, 323 of the speaker units 22, 32. Note that, in the present embodiment, the covering plates 212, 312 of the enclosures 21, 31 are overlapped with the flange parts 223, 323 of the speaker units 22, 32, the flange parts 223, 323 are overlapped with the attachment plate parts 232, 332 of the sound-emitting direction regulating members 23, 33, and all of them is fixed by using screws 24, 34.

By attaching the sound-emitting direction regulating members 23, 33, sound output from the diaphragms 221, 321 of the speaker units 22, 32 is emitted to the outside via a space surrounded by the annular portions 231, 331. When the sound-emitting direction regulating members 23, 33 are not installed, the sound output from the diaphragms 221, 321 tends to be propagated in a direction of the speaker 20 or 30 of the speakers that are adjacent to each other, through the three-dimensional fabric described later that is installed in the front surfaces of the diaphragms 221, 321, and reduce the stereo feeling. However, by providing the annular portions 231, 331, the sound emitting direction is regulated and the stereo feeling can be increased.

Figure 3:
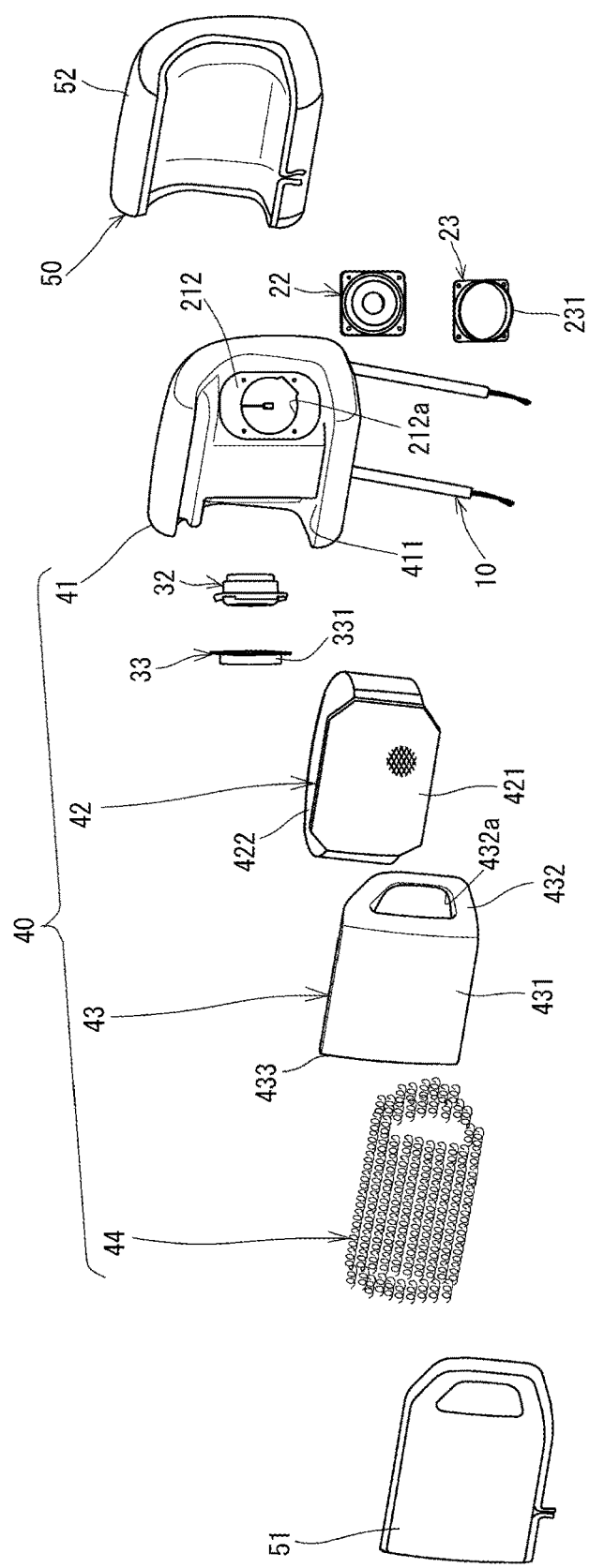
FIG. 3 is an exploded perspective view of the headrest having the speaker of FIG. 1.

The cushioning layer 40 is configured to have a first cushioning member 41, a second cushioning member 42, a third cushioning member 43, and a fourth cushioning member 44 (see FIG. 2 and FIG. 3). The first cushioning member 41 is composed of foam (typically, polyurethane foam) that is foamed integrally with the right and left enclosures 21, 31 that are attached to the longitudinal frame parts 11, 12 of the headrest frame 10 via the attachment plates 111, 121 and the connection plate 23. That is, the first cushioning member 41 is molded by, arranging a structure that is the headrest frame 10 attached with the enclosures 21, 31, in a predetermined mold, injecting a foaming raw material and making it be foamed integrally.

The first cushioning member 41 is molded so that, in a state where the covering plates 212, 312 of the enclosures 21, 31 are exposed to the outside (see FIG. 3), a range that surrounds the longitudinal frame parts 11, 12 from side surface and rear surface sides of the body cases 211, 311 of the enclosures 21, 31, and a range that is surrounded by a front surface of the connection plate 23 and side surfaces of the enclosures 21, 31, are filled with foam (see FIG. 2 and FIG. 3).

In the speaker units 22, 32, the rear projection frame parts 222, 322 are inserted from the window parts 212a, 312a of the covering plates 212, 312 of the enclosures 21, 31 that are integrally molded with the first cushioning member 41 in this way. The flange parts 223, 323 are overlapped with the covering plates 212, 312 as above, and are further overlapped with the attachment plate parts 232, 332 of the sound-emitting direction regulating members 23, 33 to be fixed by the screws 24, 34.

The second cushioning member 42 has the three-dimensional fabric 421. The three-dimensional fabric 421 has a size (width) that extends from the annular portion 231 of one sound-emitting direction regulating member 23 to the annular portion 331 of the other sound-emitting direction regulating member 33. In a part between side edges of the three-dimensional fabric 421, a rubber band 422 that serves as an elastic member is extended. In a state where the three-dimensional fabric 421 locates so as to correspond to each of the annular portions 231, 331, the rubber band 422 is installed around a rear part, that is, a back surface side of the first cushioning member 41. Thereby, due to the elasticity of the rubber band 422, the three-dimensional fabric 421 is pressed against the annular portions 231, 331. As shown in FIG. 2, the annular portions 231, 331 bite into a boundary portion 421a that corresponds to the annular parts 231, 331, of the three-dimensional fabric 421, and the three-dimensional fabric 421 of the corresponding portion is crushed in a thickness direction. Therefore, sound output from the speaker units 22, 32 passes diaphragm corresponding parts 421b, 421c that locate in an inner peripheral range of the annular portions 231, 331 that locate in the front part of each of the speaker units 22, 32 in the three-dimensional fabric 421, and is emitted to the outside.

The boundary portion 421a are pressed against the annular portions 231, 331, and thereby, the diaphragm corresponding parts 421b, 421c are applied with a predetermined tensile force. The sound output from the speaker units 22, 32 not only simply pass a clearance of the diaphragm corresponding parts 421b, 421c, but also is propagated to a surface direction (a substantially orthogonal direction in a thickness direction) by yarns composing the diaphragm corresponding parts 421b, 421c, and is emitted. On the other hand, in the boundary portion 421a that is crashed by the annular portions 231, 331 in the three-dimensional fabric 421, the yarns composing the boundary portion 421a cannot vibrate. Thus, propagation in the surface direction is performed only to the diaphragm corresponding parts 421b, 421c that locate in the inner peripheral ranges of the annular portions 231, 331, and is not performed to the three-dimensional fabric 421 that locates in the outside of the annular portions 231, 331. Accordingly, sound propagating via an intermediate region 421d that locates between the pair of annular portions 231, 331 in the three-dimensional fabric 421 is prevented, interference between sound output from the right and left speaker units 22, 32 is prevented, and the sound quality decreasing due to interference between sound can be prevented. That is, the intermediate region 421d has structure having an air layer that is blocked by the pair of annular portions 231, 331, and as a result, functions as the sound propagation preventing part. In addition, since the annular portions 231, 331 are supported in a state of biting into the boundary portion 421a, the diaphragm corresponding parts 421b, 421c of the three-dimensional fabric 421 can be prevented from flapping widely, and thereby, the sound quality decreasing due to the flapping is prevented.

As the three-dimensional fabric 421, a woven fabric, a non-woven fabric, or the like having three-dimensional structure can be used. However, using a three-dimensional knitted fabric is preferable. As disclosed in Japanese Patent Application Publication No. 2002-331603, Japanese Patent Application Publication No. 2003-182427, and the like, the three-dimensional knitted fabric is formed by connecting a pair of ground knitted fabrics arranged so as to be spaced apart with each other by a connection yarn. For example, each of the ground knitted fabrics can be formed to be a flat fabric texture (fine stitch) that continues in both directions of a wale direction and a course direction, and can be formed to be a fabric texture having a honeycomb (hexagon) mesh, from a yarn obtained by twisting a fiber. The connection yarn applies predetermined rigidity to the three-dimensional knitted fabric so that one of the ground knitted fabrics and the other of the ground knitted fabrics maintain a predetermined interval. Thereby, high cushioning property and vibration absorption property can be exhibited. In addition, due to the tensile force applied in the surface direction, the yarn of the ground knitted fabrics that compose the three-dimensional knitted fabric and face to each other, or the connection yarn that connects the ground knitted fabrics facing to each other can be chord vibrated. Thereby, chord vibration is generated by output sound of the speaker units 22, 32, the vibration is propagated in the surface direction of the three-dimensional knitted fabric. A sound wave emitted forward from the three-dimensional knitted fabric becomes a sound wave of having the three-dimensional knitted fabric as a surface sound source. That is, the three-dimensional knitted fabric performs a function of converting the output sound of the speaker units 22, 32 to a sound wave from the surface sound source having wider area than that of the point sound source, and emitting the sound wave to the outside.

The third cushioning member 43 is composed of bead foam. As shown in FIG. 2 and FIG. 3, the third cushioning member 43 is formed in a substantially U-shape in a plan view. In both side surfaces 432, 433 that hold a front surface part 431, hole parts 432a, 433a are formed, respectively. Note that, in the first cushioning member 41 described above, a stepped part 411 is formed so as to be along a shape of the third cushioning member 43 as shown in FIG. 3. In the stepped part 411, the front surface part 431 of the third cushioning member 43 and the both side surface parts 432, 433 are fitted and arranged. In addition, hole parts 432a, 433a of the third cushioning member 43 are formed so that the diaphragm corresponding parts 421b, 421c of the second cushioning member 42 communicate through the hole parts 432a, 433a, respectively.

As the bead foam composing the third cushioning member 43, for example, a foam molding body by a bead method of a resin including at least any one of polystyrene, polypropylene, and polyethylene, can be used. The expansion ratio is not limited. However, the expansion ratio of about 25 to 50 times is preferable. Due to soft elasticity of the bead, the head part can be supported elastically.

The cushioning layer 40 of the present embodiment essentially has the first cushioning member 41 that is arranged in the back surface sides of the speakers 20, 30, and the second cushioning member 42 that includes the three-dimensional fabric 421 which is arranged in the front surface side of the speakers 20, 30. It is preferable that the third cushioning member 43 formed of the bead foam is installed to support the head part elastically, and increase the shock absorbing property, depending on the thickness of the three-dimensional fabric 421 composing the second cushioning member 42 (when a plurality of three-dimensional fabrics 421 are laminated and used, the number of laminated fabrics), the fabric texture of the ground knitted fabrics, the quality of material of the connection yarn, the way of installment of the connection yarn, and the like.

In the present embodiment, the fourth cushioning member 44 is further laminated on the third cushioning member 43 as shown in FIG. 3. The fourth cushioning member 44 is formed by a cotton and is formed in a substantially same shape as the third cushioning member 43. The fourth cushioning member 44 is installed in order to provide soft touch feeling when the head part contacts with the fourth cushioning member 44. The fourth cushioning member 44 can be installed as needed, and can be installed by being composed not of a cotton, but a slab urethane, or the like, or a combination thereof as appropriate.

The skin member 50 can be formed of a fabric, a synthetic leather, a real leather, or the like. In the present embodiment, the skin member 50 includes the one that is trim cover mode in which a wadding material and a rear base fabric are integrally sewn in a rear surface. In addition, the skin member 50 of the present embodiment is composed of two members of a front skin member 51 and a rear skin member 52. In the first cushioning member 41 that is foamed integrally with the headrest frame 10 and the enclosures 21, 31, the sound-emitting direction regulating members 23, 33 that includes the speaker units 22, 32, and the annular portions 231, 331, are installed. Further, the second cushioning member 42 that has the three-dimensional fabric 421 is installed, and the third cushioning member 43 and the fourth cushioning member 44 are installed. After that, the rear skin member 52 covers the first cushioning member 41 from rearward thereof, the front skin member 51 locates in a front surface of the fourth cushioning member 44, the front skin member 51 and the rear skin member 52 are joined by a fastener or the like that is provided between both of them, and thereby the skin member 50 is installed.

According to the present embodiment, the sound output from the speaker units 22, 32 is regulated by the annular portions 231, 331 of the sound-emitting direction regulating members 23, 33. The sound output from the diaphragms 221, 321 of the speaker units 22, 32 passes the inside of the annular portions 231, 331 and is emitted. At this time, the boundary portion 421a of the three-dimensional fabric 421 that composes the second cushioning member 42 is bitten into by the annular portions 231, 331 and is pressed. The vibration corresponding parts 421b, 421c that are regions where the sound passes are prevented from flapping widely in reaction to sound having a predetermined frequency around a resonance frequency. In addition, since the boundary portion 421a of the three-dimensional fabric 421 is bitten into by the annular portions 231, 331 and thereby, is crashed, sound that is propagated in the surface direction of the three-dimensional fabric 421 in the boundary portion 421a is blocked, interference between sound output from right and left speaker units 22, 32 is prevented, and the stereo feeling can be improved under the condition where an area where the right and left speakers 20, 30 can be installed is limited by the size of the headrest 10.

FIG. 6 to FIG. 9 show the headrest 1 according to another embodiment of the present invention. The present embodiment is similar to the embodiment described above in having the headrest frame 10, the right and left pair of speakers 20, 30 that are supported by the headrest frame 10, and the sound-emitting direction regulating members 23, 33 that have the annular portions 231, 331, that surround the diaphragms 221, 321 of the speaker units 22, 32. However, configuration of a cushioning layer 4000 is different. The cushioning layer 4000 has a three-dimensional fabric 4200 that extends from one of the sound-emitting direction regulating members 23 to the other of the sound-emitting direction regulating members 33, which is similar to the embodiment described above. However, foam 4100 formed of a polyurethane foam or the like is provided by integral foam and cover molding. In addition, in a front surface of the three-dimensional fabric 4200, a head part supporting plate 4300 is elastically supported by spring members 4310, 4310.

That is, in the present embodiment, first, the enclosures 21, 31 are fixed to the headrest frame 10. Further, the speaker units 22, 32 are installed, and the sound-emitting direction regulating members 23, 33 that have the annular portions 231, 331 are installed beforehand as similar to the embodiment described above. Further, side edge portions 4220a, 4230a of the three-dimensional fabric 4200 are fixed to an outside edge portion 213a of a peripheral portion 213 of one enclosure 21, and an outside edge portion 313a of a peripheral portion 313 of the other enclosure 31, respectively. The side edge portions 4220a, 4230a are attached with engagement plates 4240, 4240, respectively made of synthetic resin or the like. The three-dimensional fabric 4200 is tensioned and arranged by making the engagement plates 4240, 4240 of the side edge portions 4220a, 4230a go around to a rear surface side of the outside edge portions 213a, 313a that are bent in a substantially U-shape of the enclosures 21, 31, and are engaged. At this time, the fixation is performed by tensioning so that the annular portions 231, 331 bite into the three-dimensional fabric 4200. Note that, the portion in the three-dimensional fabric 4200 where the annular portions 231, 331 bite into is regarded as a boundary portion 4210 as similar to above.

The longitudinal frame parts 11, 12 of the headrest frame 10 and projection frame parts 14, 15 that are bent forward from the longitudinal frame parts 11, 12 are attached with a side portion supporting members 63, 63. The side portion supporting members 63, 63 are provided in an outside part of diaphragm corresponding parts 4220, 4230 in the three-dimensional fabric 4200, and are formed with hole parts 631, 631 through which sound output from the speaker units 22, 32 passes. Inner peripheral edge portions 631a, 631a of the hole parts 631, 631 project inward and provided so as to contact with, preferably bite into, the three-dimensional fabric 4200 in a position that is slightly inner from the boundary portion 4210 of the three-dimensional fabric 4200 (slightly closer to the center of the diaphragm corresponding parts 4220, 4230) (see FIG. 7).

The head part supporting plate 4300 is supported by two spring members 4310, 4310 composed of a leaf spring provided to project inward, in front edge portions of the side portion supporting members 63, 63. At this time, the head part supporting plate 4300 is provided to locate in a front surface of an intermediate region 4250 that locates between the right and left annular portions 231, 331, in the three-dimensional fabric 4200.

In the present embodiment, the skin member 50 is arranged in a mold, in the inside thereof, the unit obtained as above is arranged, and a foaming raw material such as a polyurethane foaming raw material is injected and foamed integrally. Note that, to the diaphragm corresponding parts 4220, 4230 in the three-dimensional fabric 4200, masking tape or the like is bonded in order to prevent the foaming raw material from intruding.

Figure 9:
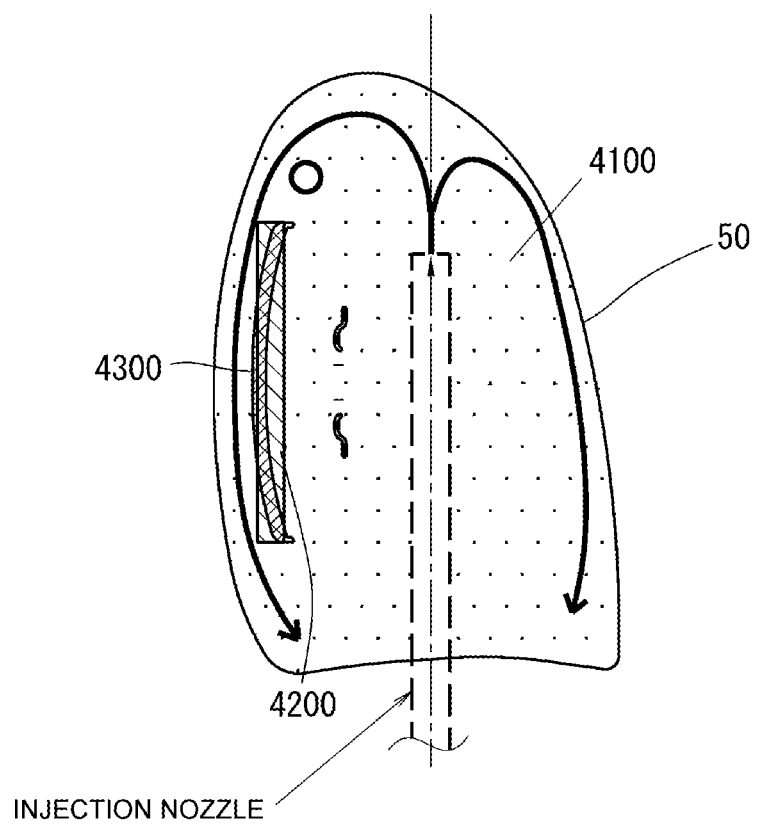
FIG. 9 is a diagram for explaining a method of injecting a foaming raw material.

In the present embodiment, as shown in FIG. 9, an injection nozzle is inserted between the enclosures 21, 31 to inject the foaming raw material. However, when the foaming raw material flows in the skin member 50, the head part supporting plate 4300 that is elastically supported by the spring members 4310, 4310 swings due to the flow pressure. Thus, even when a gap between the head part supporting plate 4300 and the skin member 50 that locates in front of the head part supporting plate 4300 is narrow, the foaming raw material is easy to be distributed evenly all over the inside of the skin member 50.

The head part supporting plate 4300 is formed to be, for example, a substantially rectangular plate shape from a synthetic resin such as a polypropylene, locates in a front surface of the intermediate region 4250 of the three-dimensional fabric 4200, and has a size to cover the whole intermediate region 4250. Accordingly, with respect to the intermediate region 4250 of the three-dimensional fabric 4200, intrusion amount of the foaming raw material from a gap side between the head part supporting plate 4300 and the skin member 50 that locates in front of the head part supporting plate 4300 is small. However, from the rear surface side of the intermediate region 4250, the foaming raw material intrudes into a range of a thickness of the intermediate region 4250. Even when the foaming raw material intrudes into the intermediate region 4250, since the annular portions 231, 331 of the sound-emitting direction regulating members 23, 33 bite into the boundary portion 4210 described above in the three-dimensional fabric 4200, and thereby, the foaming raw material does not flow into the diaphragm corresponding parts 4220, 4230. In addition, in the present embodiment, the inner peripheral edge portions 631a, 631a of the hole parts 631, 631 of the side portion supporting members 63, 63 project inward, and are provided to contact with, preferably bite into, the three-dimensional fabric 4200 in a position that is slightly inner than the boundary portion 4210 of the three-dimensional fabric 4200 (slightly closer to the center of the diaphragm corresponding parts 4220, 4230). Thus, even when flowing slightly to the diaphragm corresponding parts 4220, 4230 side beyond the boundary portion 4210, the foaming raw material is dammed by the inner peripheral edge portions 631a, 631a of the hole parts 631, 631.

The headrest 1 of the present embodiment produced in this way has structure in which the intermediate region 4250 of the three-dimensional fabric 4200 is filled with the foam (polyurethane foam). As a result, the sound output from the speaker units 22, 32 is regulated by the annular portions 231, 331 of the sound-emitting direction regulating members 23, 33 as similar to the embodiment described above. This functions as prevention of flapping of the diaphragm corresponding parts 4220, 4230 of the three-dimensional fabric 4200, and prevention of propagation of sound beyond the boundary portion 4210 due to the bite into of the annular portion 231, 331. In addition, this can reliably block propagation of sound by the foam with which the intermediate region 4250 is filled. That is, the intermediate region 4250 functions as the sound propagation preventing part more reliably, and can further increase the stereo feeling of sound.

Note that, in the present embodiment, since the head part supporting plate 4300 is elastically supported by the spring members 4310, 4310, even when the foam with which the front surface of the head part supporting plate 4300 is filled is thin, the head part can be elastically supported. Also, predetermined shock absorbing property can be exhibited. This can reduce cost and weight by reducing the use amount of the foam. Particularly, in a case of the headrest 1 having a speaker that incorporates the speakers 20, 30, the thickness of the foam 4100 with which a part between the speakers 20, 30, and the front surface part of the skin member 50 with which the head part of a human contacts is filled, is limited naturally. Thus, in order to supplement the elastically supporting property of the head part, it is preferable that the head part supporting plate 4300 that is supported by the spring members 4310, 4310, as above is installed.

The head part supporting plate 4300 may be made of metal. However, it is preferable that the head part supporting plate 4300 is made of synthetic resin as above in consideration of weight and processing easiness. In addition, it is preferable that an easy-to-deform part 4320 is provided that can increase the cushioning property by making the head part supporting plate 4300 easy to curve rearward when receiving a load of the head part, and is a starting point of deformation of quickly deforming when receiving a predetermined or more load due to shock by rear-end collision, or the like. Thereby, when receiving shock, the head part supporting plate 4300 deforms quickly from the easy-to-deform part 4320 to prevent bounce back of the head part and absorb the shock, behavior difference with a chest part becomes small, and this can reduce neck injury.

Figure 10:
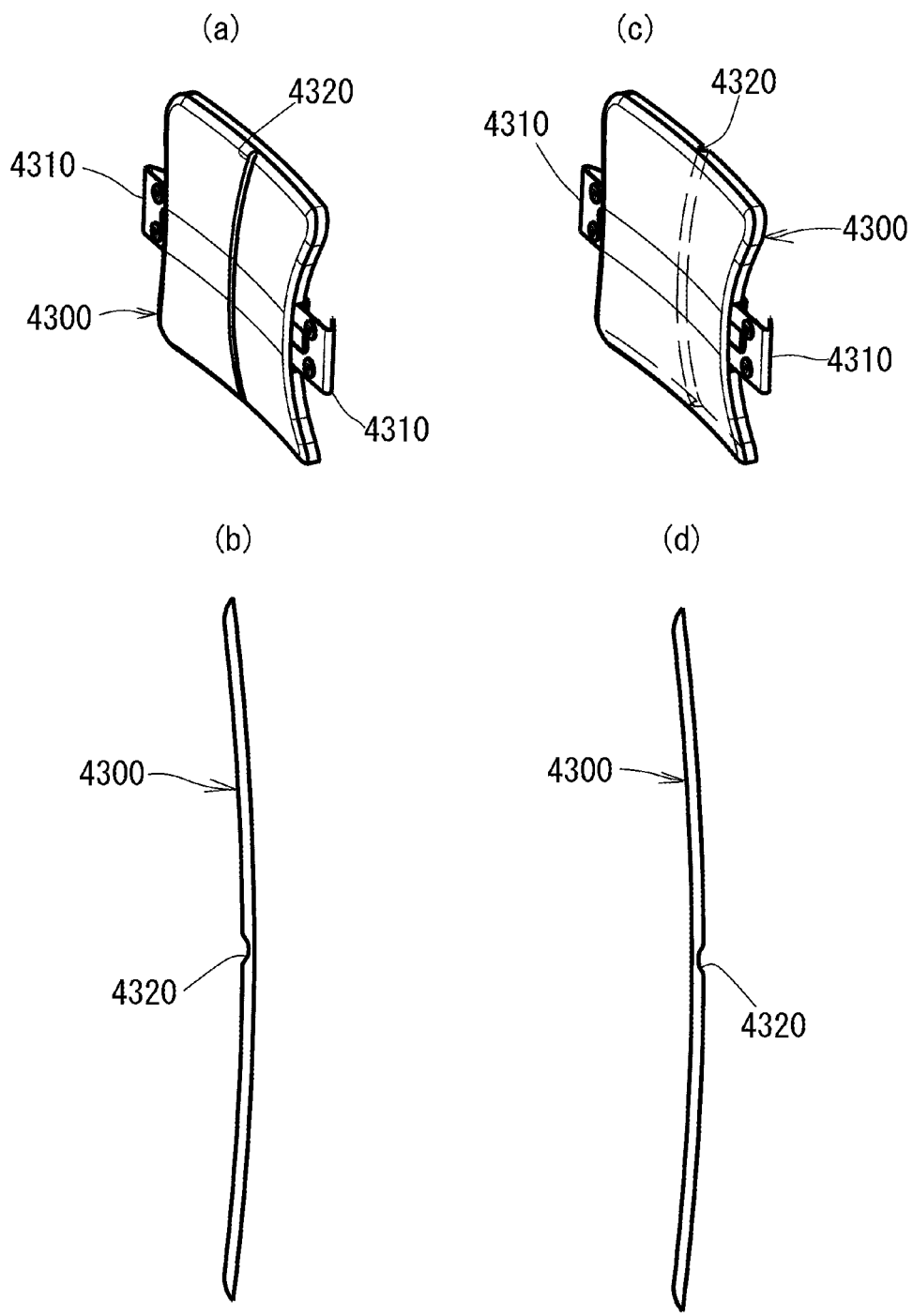
FIG. 10(a) is a perspective view of a mode in which an easy-to-deform part is formed in a surface of a head part supporting plate.
FIG. 10(b) is a plan view thereof.
FIG. 10(c) is a perspective view of a mode in which the easy-to-deform part is formed in a rear surface of the head part supporting plate.
FIG. 10(d) is a plan view thereof.

The easy-to-deform part 4320 is not limited in its setting if it functions as above. However, as shown in FIG. 10(*a*) to (*d*), it is preferable that the easy-to-deform part 4320 is formed of a groove formed longitudinally in a front surface or a rear surface near the substantially center in the width direction of the head part supporting plate 4300. The head part supporting plate 4300 curves or bents so that a part near the substantially center in the width direction is displaced rearward, due to a shock load, and shock can be absorbed while supporting balance between right and left of the head part is relatively maintained. In addition, since only groove needs to be provided, configuration is easy. In FIG. 10(*a*) to (*d*), the easy-to-deform part 4320 is formed in the front surface or the rear surface of the head part supporting plate 4300. However, the easy-to-deform part 4320 can be engraved in both sides, and can be formed of a plurality of grooves engraved in one side or both sides.

Figure 11:
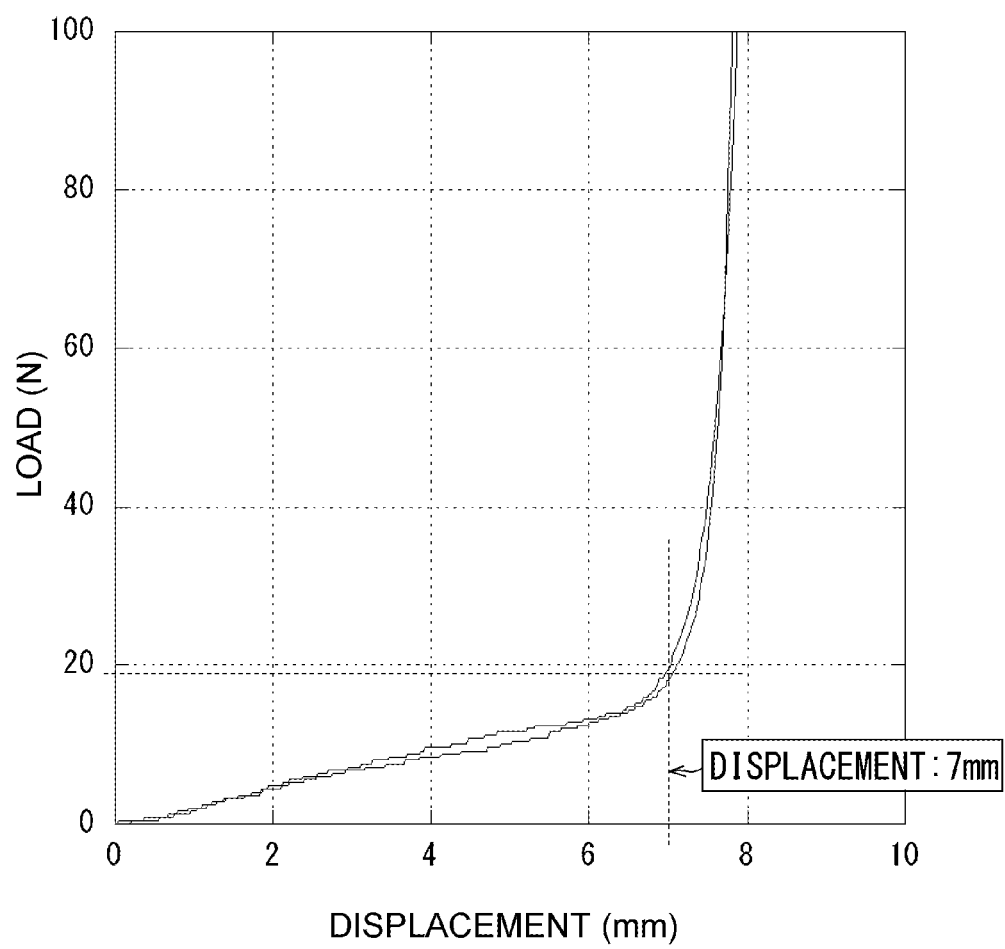
FIG. 11 is a view in which load-displacement characteristics of a three-dimensional fabric used in the headrest having a speaker of FIG. 6 is measured.

The three-dimensional fabric 4200 that is used in the present embodiment is placed alone on a flat plate and load-displacement characteristics when being applied with pressure to 100N by 50 mm/min by a compression plate having a diameter of 30 mm, is measured. The result is shown in FIG. 11.

The structure of the three-dimensional fabric 4200 used in the measurement is as follows.

Produced by Suminoe Textile Co., Ltd., Product No.: 49013D, 11 mm thickness,

Material: Ground knitted fabric in front side—two-twisted yarn of 450 decitex/108f polyethylene terephthalate fiber false twist-processed yarn Ground knitted fabric in rear side—two-twisted yarn of 450 decitex/108f polyethylene terephthalate fiber false twist-processed yarn Connection yarn—350 decitex/1f polytrimethylene terephthalate monofilament As is clear from the measurement result in FIG. 11, until when the displacement is 7 mm and the load is 19N, it transitions with a low spring constant. However, after the displacement reaches 7 mm, the load value rises sharply. Accordingly, when the bite amount of the annular portions 231, 331 of the sound-emitting direction regulating members 23, 33 into the three-dimensional fabric 4200 is set to be around 7 mm, more compression of the three-dimensional fabric 4200 is substantially difficult. Thus, the function of preventing the foaming raw material from intruding into the diaphragm corresponding parts 4220, 4230 from the intermediate region 4250, in producing, becomes high. As a result, independence of the intermediate region 4250 held between the annular portions 231, 331 is increased, and the function as the sound propagation preventing part is also further increased. Note that it is not limited to the present embodiment that setting the bite amount of the annular portions 231, 331 into the three-dimensional fabric 4200 to the sharp rising point of the load value (7 mm in case of the three-dimensional fabric used in the measurement in FIG. 11) is preferable. This is similar also in the embodiment shown in FIG. 1 to FIG. 5.

The embodiment shown in FIG. 6 to FIG. 9 has structure in which the three-dimensional fabric 4200 is installed by extending from one enclosure 21 to the other enclosure 31, and the also the intermediate region 4250 is filled with the foam. Thereby, as described above, interference between sound output from the two speaker units 22, 32 can be prevented. However, when the density of the yarn of the three-dimensional knitted fabric, or the like, that composes the three-dimensional fabric 4200 is a predetermined density or more, rigidity becomes too high due to integration with the foam and front and back movement of the head part supporting plate 4300 can be prevented.

Figure 12:
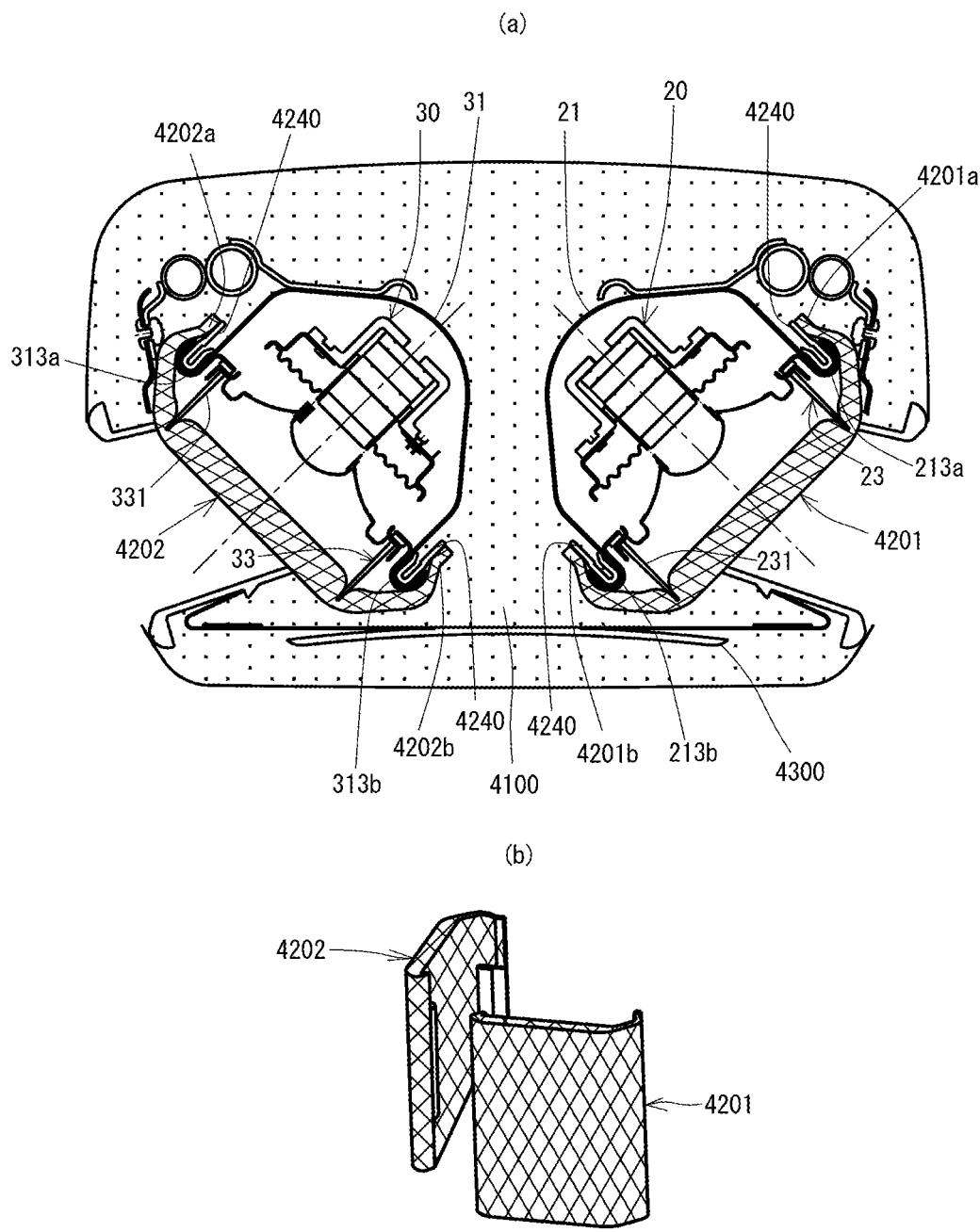
FIG. 12(a) is a cross-sectional view of an inner mechanism of the headrest having the speaker according to still another embodiment of the present invention.
FIG. 12(b) is a perspective view showing a first three-dimensional fabric and a second three-dimensional fabric used in the embodiment.

In consideration of such case, as shown in FIG. 12, the present invention can be configured so that a first three-dimensional fabric 4201 and a second three-dimensional fabric 4202 are separately provided to one speaker 20 and the other speaker 30, respectively.

Particularly, the first three-dimensional fabric 4201 has structure provided with a predetermined tensile force by engaging an outside end edge 4201*a* and an inside end edge 4201*b* to between the outside edge portion 213*a* and the inside end portion 213*b* of the enclosure 21 of one speaker 20, via the engagement plates 4240, 4240, respectively. The second three-dimensional fabric 4202 has structure provided with a predetermined tensile force by engaging an outside end edge 4202*a* and an inside end edge 4202*b* to between the outside edge portion 313*a* and the inside end portion 313*b* of the enclosure 31 of the other speaker 30, via the engagement plates 4240, 4240, respectively. Thereby, in between the annular portion 231 of the sound-emitting direction regulating member 23 in one speaker 20 side, and the annular portion 331 of the sound-emitting direction regulating member 33 in the other speaker 30 side, the foam 4100, not the three-dimensional fabric, functions as the sound propagation preventing part. According to the configuration shown in FIG. 12, as compared to a case of integrating the three-dimensional knitted fabric and the foam, rigidity of the portion that locates in the back surface side of the head part supporting plate 4300 decreases, the head part supporting plate 4300 is easy to move in front and back, and the function of the shock absorbing property by the head part supporting plate 4300 can be exhibited enough.

Figure 13:
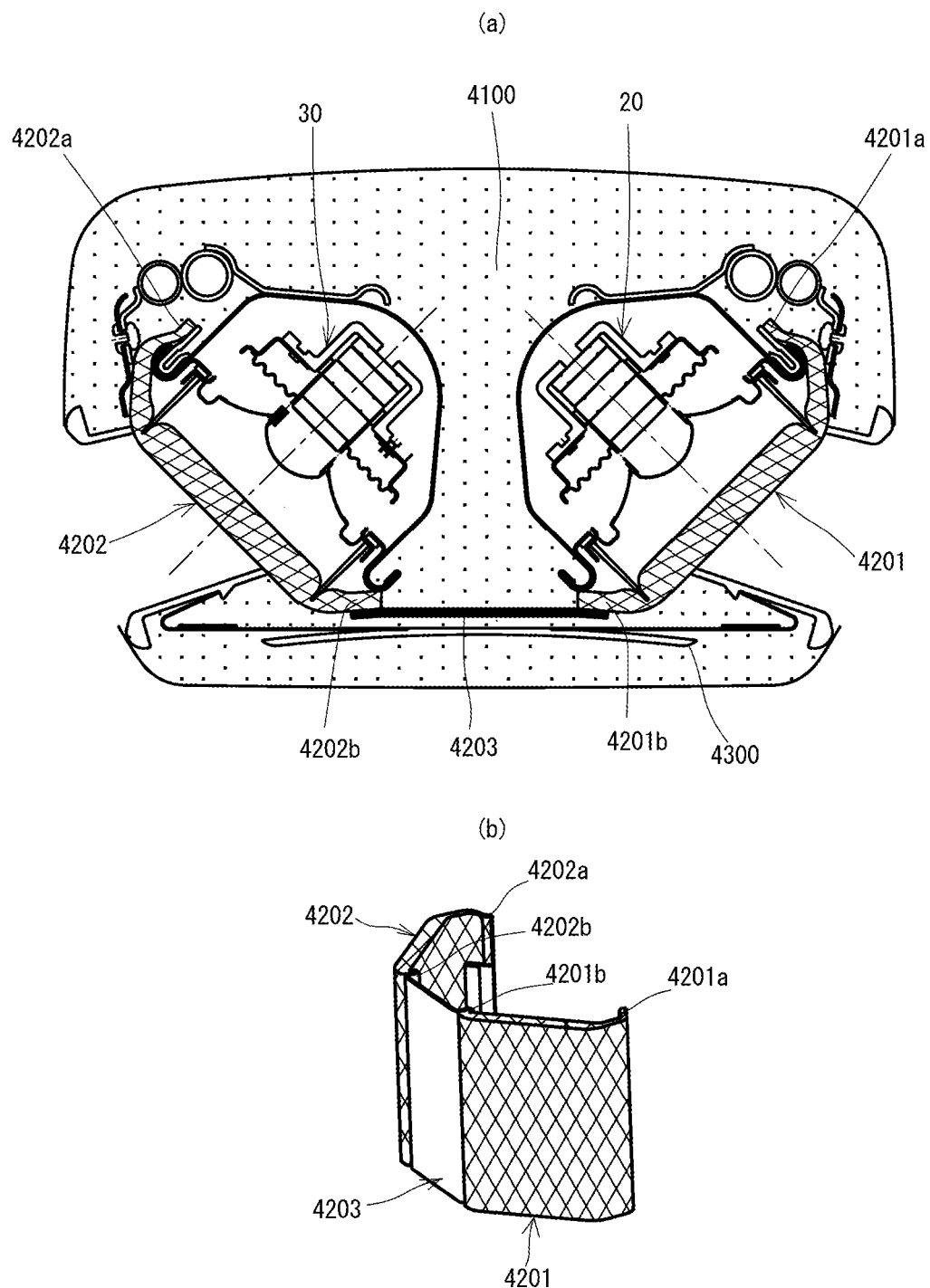
FIG. 13(a) is a cross-sectional view of an inner mechanism of the headrest having the speaker according to still another embodiment of the present invention.
FIG. 13(b) is a perspective view showing a first three-dimensional fabric and a second three-dimensional fabric used in the embodiment, and a state where the first three-dimensional fabric and the second three-dimensional fabric are connected by a connection cloth.

On the other hand, in a case of the configuration shown in FIG. 12, the first three-dimensional fabric 4201 and the second three-dimensional fabric 4202 need to be tensioned and arranged separately. However, as shown in FIG. 13, the present invention may be configured so that the inside end edges 4201*b*, 4202*b* of the first three-dimensional fabric 4201 and the second three-dimensional fabric 4202 are connected to each other by using a connection cloth 4203 formed of a two-dimensional textile such as canvas, a two-dimensional non-woven fabric, a two-dimensional knitted fabric, or a net member, or the like. In case of such configuration, as similar to the embodiment shown in FIG. 6 to FIG. 9, only the outside end edges 4201*a*, 4202*a* of the first three-dimensional fabric 4201 and the second three-dimensional fabric 4202 need to be engaged to the outside edge parts 213*a*, 313*a* of the enclosures 21, 31. In addition, since the connection cloth 4203 is not the three-dimensional fabric, even when the connection cloth 4203 is integrated with the foam 4100, the rigidity of the connection cloth 4203 does not become higher than needed, and the shock absorbing property by the head part supporting plate 4300 can be exhibited enough.

EXPLANATION OF REFERENCES

1 Headrest having speaker
10 Headrest frame
20, 30 Speakers
21, 31 Enclosures
22, 32 Speaker units
221, 321 Diaphragms
23, 33 Sound-emitting direction regulating members
231, 331 Annular portions
40, 4000 Cushioning layer
41 First cushioning member
42 Second cushioning member
421, 4200 Three-dimensional fabrics
43 Third cushioning member
44 Fourth cushioning member
4300 Head part supporting plate
50 Skin member

The invention claimed is:

1. A headrest having a speaker, the headrest comprising:
a plurality of speakers that are supported by a headrest frame with predetermined intervals;
sound-emitting direction regulating members that surround peripheries of diaphragms of each of the speakers, and include annular portions projecting forward by a predetermined distance; and
a three-dimensional fabric that is tensioned and installed in a state where each of the annular portions of each of the sound-emitting direction regulating members bites into the three-dimensional fabric,
wherein each of the annular portions bites into the three-dimensional fabric without penetrating an outer surface of the three-dimensional fabric, and flapping in response to sound around a resonance frequency of the three-dimensional fabric is prevented.

2. The headrest having a speaker according to claim 1, wherein a sound propagation preventing part that prevents sound propagation between each of the speakers, is provided in between each of the annular portions of each of the adjacent sound-emitting direction regulating members.

3. The headrest having a speaker according to claim 2, wherein a part between each of the annular portions of each of the adjacent sound-emitting direction regulating members is filled with foam, and the foam is the sound propagation preventing part.

4. The headrest having a speaker according to claim 2, wherein the three-dimensional fabric has a size that extends from one of the sound-emitting direction regulating members to the other of the sound-emitting direction regulating members, and an intermediate region that locates in between each of the adjacent annular portions in the three-dimensional fabric is the sound propagation preventing part.

5. The headrest having a speaker according to claim 4, wherein the intermediate region of the three-dimensional fabric composing the sound propagation preventing part is filled with foam.

6. The headrest having a speaker according claim 1, wherein the three-dimensional fabric is a three-dimensional knitted fabric.

7. The headrest having a speaker according to claim 1, wherein a front surface of the three-dimensional fabric includes a head part supporting plate that is elastically supported.

8. The headrest having a speaker according to claim 7, wherein an easy-to-deform part that is a start point of deformation when the head part supporting plate receives a load, is set in the head part supporting plate.

9. The headrest having a speaker according to claim 8, wherein the easy-to-deform part is formed of a groove that is formed longitudinally near a substantially center in a width direction of the head part supporting plate.

10. The headrest having a speaker according to claim 1, wherein the three-dimensional fabric is reduced in a thickness direction where each of the annular portions of each of the sound-emitting direction regulating members bites into the three-dimensional fabric.

\* \* \* \* \*